United States Patent
Beuschel et al.

(10) Patent No.: US 11,639,999 B2
(45) Date of Patent: May 2, 2023

(54) METHOD FOR IMPROVED NEAR AND REMOTE DETECTION OF A LIDAR RECEIVING UNIT

(71) Applicants: ZF FRIEDRICHSHAFEN AG, Friedrichshafen (DE); IBEO AUTOMOTIVE SYSTEMS GMBH, Hamburg (DE)

(72) Inventors: Ralf Beuschel, Wangen (DE); Michael Kiehn, Hamburg (DE)

(73) Assignee: Ibeo Automotive Systems GmbH, Hamburg (DE)

(*) Notice: Subject to any disclaimer, the term of this patent is extended or adjusted under 35 U.S.C. 154(b) by 248 days.

(21) Appl. No.: 16/772,908

(22) PCT Filed: Nov. 16, 2018

(86) PCT No.: PCT/EP2018/081592
§ 371 (c)(1),
(2) Date: Jun. 15, 2020

(87) PCT Pub. No.: WO2019/115149
PCT Pub. Date: Jun. 20, 2019

(65) Prior Publication Data
US 2020/0309915 A1    Oct. 1, 2020

(30) Foreign Application Priority Data
Dec. 15, 2017   (DE) .................. 102017222969.1

(51) Int. Cl.
*G01S 17/89*    (2020.01)
*G01S 7/481*    (2006.01)
*G01S 17/48*    (2006.01)

(52) U.S. Cl.
CPC ............ *G01S 17/89* (2013.01); *G01S 7/4815* (2013.01); *G01S 17/48* (2013.01)

(58) Field of Classification Search
CPC ............................ G01S 17/89; G01S 17/4815
See application file for complete search history.

(56) References Cited

U.S. PATENT DOCUMENTS

| | | |
|---|---|---|
| 2010/0051836 A1 | 3/2010 | Kim |
| 2012/0242972 A1 | 9/2012 | Wee |

(Continued)

FOREIGN PATENT DOCUMENTS

| | | |
|---|---|---|
| EP | 3168641 A1 | 5/2017 |
| JP | 2014-059301 A | 4/2014 |

(Continued)

OTHER PUBLICATIONS

Office Action for Japanese patent application No. 2020-552102 dated Jul. 14, 2021.

(Continued)

*Primary Examiner* — Jerry T Jean Baptiste
(74) *Attorney, Agent, or Firm* — Kelly & Kelley, LLP

(57) ABSTRACT

Method for the improved near and remote detection of a LIDAR receiving unit for motor vehicles, wherein the receiving unit has a plurality of sensor elements, wherein the sensor elements can be activated and deactivated, wherein at least a subset of the sensor elements are activated at a first point in time within a measurement cycle, wherein one or more sensor elements are activated and/or one or more sensor elements are deactivated at a second point in time within the measurement cycle, said second point in time occurring after the first point in time.

4 Claims, 4 Drawing Sheets

(56) References Cited

U.S. PATENT DOCUMENTS

Figure 1:
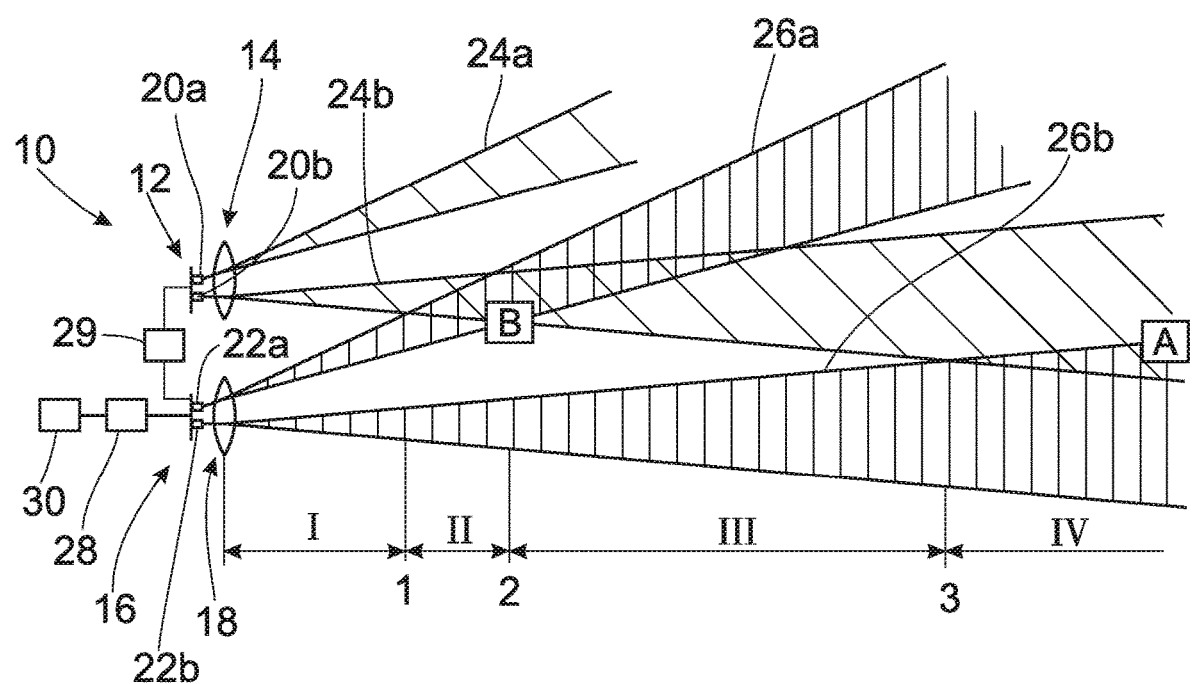

| | | |
|---|---|---|
| 2014/0078491 A1 | 3/2014 | Eisele et al. |
| 2017/0176575 A1 | 6/2017 | Smits |
| 2018/0072313 A1* | 3/2018 | Stenneth ................. G01S 17/89 |
| 2020/0249354 A1* | 8/2020 | Yeruhami ................. B60S 1/02 |

FOREIGN PATENT DOCUMENTS

| | | |
|---|---|---|
| JP | 2014-169921 A | 9/2014 |
| JP | 2015-227781 A | 12/2015 |
| KR | 10-2015-0090777 A | 8/2015 |
| WO | 2017081294 A1 | 5/2017 |

OTHER PUBLICATIONS

Search Report for the German Application No. 10 2017 222 969.1 dated Aug. 24, 2018.

* cited by examiner

METHOD FOR IMPROVED NEAR AND REMOTE DETECTION OF A LIDAR RECEIVING UNIT

The invention relates to a method for the improved near and remote detection of a LIDAR receiving unit for motor vehicles.

Such LIDAR receiving units are known, for example, for LIDAR measuring systems according to document WO 2017 081 294. This LIDAR measuring system has a LIDAR transmitting unit and a LIDAR receiving unit. Emitter elements of the LIDAR transmitting unit emit light pulses that pass through a transmitting lens and are reflected at an object. A reflected light pulse is focused onto sensor elements of the receiving unit via a receiving lens, so that the pulse can be detected. The distance from the object to the LIDAR measuring system can be determined on the basis of the time of flight of the light pulse. Due to different effects, a plurality of laser pulses sent in succession from the same emitter element can impinge on the receiving unit at different locations. This is the case, for example, due to a switch from a near-field measurement, in which the object is a short distance from the LIDAR measuring system, to a far-field measurement in which the object is a greater distance from the LIDAR measuring system. Ultimately, this is due to the spatial structure of such a LIDAR measuring system with receiving unit and transmitting unit in the focal plane array configuration, i.e. the arrangement of the emitter elements and the sensor elements in a plane and an arrangement at the focal point of a respective lens. The focal plane array configuration does not avoid the use of components that introduce mobility into the LIDAR measuring system or its components. The local displacement of the incoming laser pulse on the receiving unit can impair the detection of the laser light.

The object is therefore to provide a method in which the near and remote detection of objects in a LIDAR receiving unit and a LIDAR measuring system is improved.

The object is achieved by a method according to Claim 1.

The method is particularly suitable for a LIDAR receiving unit in accordance with the following embodiments. The LIDAR receiving unit is normally part of a LIDAR measuring system. The LIDAR measuring system is particularly suitable for a motor vehicle. It is advantageous to install multiple identical LIDAR measuring systems on a motor vehicle to monitor the entire environment of the vehicle.

The LIDAR measuring system has a LIDAR transmitting unit, a transmitting lens and a LIDAR receiving unit and a receiving lens. In addition, the LIDAR measuring system is conveniently equipped with an electronics unit, which enables an evaluation unit to evaluate the measured data and can communicate with other systems of a motor vehicle for the transmission of data. In particular, the LIDAR measuring system has exactly two units, one for the sensor elements and one for the emitter elements.

The transmitting unit has a plurality of emitter elements for transmitting laser pulses, while the receiving unit has a plurality of sensor elements for detecting the laser pulses. The emitter elements are conveniently formed as vertical cavity surface emitting lasers, VCSEL, whereas the sensor elements are preferably formed by single photon avalanche diodes, SPAD.

The sensor elements usually have a smaller surface than an emitter element and its laser pulse projected onto the receiving unit. As a result, more than one sensor element can be illuminated by a laser pulse. In addition, due to various effects, the incoming laser light can strike different points of the receiving unit. This actual position is described as a displacement from an optimum reference position in which the laser light strikes the receiving unit in optimal conditions and after reflection at an object a long distance away. The size of the displacement can have the dimensions of one or more sensor elements.

As a result, the number of sensor elements on the receiving unit is advantageously greater than the number of emitter elements of the transmitting unit. In particular, a plurality of sensor elements is notionally assigned to one emitter element, wherein each of the sensor elements can potentially receive a laser pulse from the emitter element.

The sensor elements of the macro cells are advantageously all of the same type, i.e. only the same SPADs are installed, for example. A similar situation is also advantageous for the emitter elements of the transmitting unit.

The emitter elements and the sensor elements are advantageously each arranged on a chip on the transmitting unit or the receiving unit, which are also called emitter chip and sensor chip. Such a chip essentially provides a plane surface. This plane, or the emitter elements and sensor elements arranged thereon, are then arranged on the LIDAR measuring system at a focal point of a respective lens. This arrangement in a plane and at the focal point is also referred to as a focal plane array configuration, FPA. It is particularly advantageous if all emitter elements are implemented on the transmitting unit and all sensor elements on the receiving unit.

The LIDAR measuring system with transmitting unit and receiving unit in the FPA configuration is preferably designed to be static. In other words, the components are installed in fixed positions so that the LIDAR measuring system and its components cannot execute relative motion. This makes the LIDAR measuring system cost-effective, robust and compact. In particular, the LIDAR measuring system is also statically arranged on a motor vehicle.

The sensor elements are organized on the receiving unit in macro cells. Each macro cell has a plurality of sensor elements, in particular at least two sensor elements. Advantageously, there can also be many more sensor elements. The number of sensor elements is advantageously between five and forty units.

A macro cell is assigned to an emitter element of the transmitting unit. This assignment is essentially implemented by the lenses. An emitter element and a sensor element are mapped to a specific solid angle by the corresponding lens, so that the emitter element and the sensor element monitor this solid angle. The sensor element, which monitors the same solid angle as an emitter element, is therefore assigned to it. Accordingly, a macro cell is assigned to an emitter element via the sensor elements of the former.

The emitter elements on the transmitting unit preferably have a planar configuration. The emitter elements are preferably arranged in a matrix structure on the transmitting chip of the transmitting unit, for example in rows and columns or in a hexagonal pattern. The macro cells are accordingly arranged on the receiving unit in the same spatial configuration, so that a laser pulse emitted by an emitter element is imaged on to the associated macro cell.

The LIDAR measuring system preferably works according to the scanning procedure. According to this, a measurement operation is performed first for a selection of pairs of emitter element and sensor element. The measurement operation is then performed for another selection of emitter-element sensor-element pairs. For example, a first measurement operation is carried out for a line or row of emitter elements and their associated sensor elements. The same measurement operation is then carried out for another line or row. This means that sensor elements that are arranged adjacent to the actually associated sensor elements are not affected by another measurement operation.

The sensor elements of a macro cell on the receiving unit are connected to at least one readout unit. For example, the readout unit can be implemented by a time to digital converter, also known as a TDC. This reads out the measurements of the sensor elements and stores them in a storage element, which preferably represents a histogram. A measurement operation is preferably carried out according to the TCSPC method, time correlated single photon counting.

A measurement cycle essentially begins with the transmission of a light pulse by an emitter element of the transmitting unit and essentially ends with the expiry of the measurement period. This measurement period corresponds to the time required by an emitted light pulse to travel to the maximum measurement range and back. This light pulse passes through the transmission lens, which directs the light pulse into the corresponding solid angle. In appropriate cases the light pulse is reflected at an object and is then incident on a sensor element via the receiving lens.

For example, the time of arrival of the light pulse is written to the histogram of the storage element as a digital value. Each detected photon is recorded in this histogram. Depending on the configuration of the measuring system and the transmitting and receiving unit, this measurement cycle can be performed once or multiple times per measurement. In the case of multiple passes, the described method is performed correspondingly frequently. In particular, in a measurement operation according to the TCSPC method a measurement cycle is carried out multiple times, for example 200 times.

Using the time of flight method, i.e. the transit time of the light pulse, the distance to the object can be determined by the evaluation unit from the measurements. The length of the measurement path is advantageously about 300 metres, which corresponds to an approximate transit time of the laser pulse of about two microseconds.

Either one or a plurality of readout elements can be formed on one macro cell. The sensor elements are accordingly connected to the readout element or the readout elements. Each sensor element is connected to at least one readout element. Particularly advantageously, one sensor element is connected to only a single readout element. Connected means that the readout element can read out a detection of a sensor element and store the information from the detection in a storage element. A sensor element can only be read out by the readout element when the former is active. Particularly advantageously, the readout element is connected to all the sensor elements of the macro cell. However, this does not exclude the possibility that the readout element is also connected to further sensor elements of other macro cells, for example, sensor elements of macro cells that are inactive during the measurement cycle.

A macro cell is a construct that is normally defined not on the basis of the hardware configuration, but on the basis of the control and evaluation logic. However, the macro cell can be defined by a specific hardware configuration, i.e. the deliberate arrangement and connection of sensor elements and readout elements. The macro cell, or its sensor elements, advantageously cover an area that is larger than the surface area of the emitter element or the projection area of the incident laser light. This allows the above-mentioned displacement due to near- and far-field effects to be compensated. This displacement is due in particular to a parallax error. In the case of such a parallax error, the displacement depends on the distance of the object from the measuring system. The macro cell preferably covers an area at least several times larger than the projection area of the laser light or the area of an emitter element.

The sensor elements can be activated and deactivated individually or as a plurality of sensor elements grouped together. The first variant is particularly preferred. The grouped activation corresponds to the simultaneous activation or deactivation of a plurality of sensor elements, preferably a subset of a macro cell. The activation and deactivation in a SPAD is achieved, for example, by raising or lowering the bias voltage. Deactivated elements cannot detect incoming photons and cannot be read out by the readout element either. A photon incident on an active sensor element can be read out by the readout element.

The activation and deactivation of the sensor element can be direct or indirect. In the former case, with a SPAD, for example, a bias voltage is applied so that it is active. For deactivation, the bias voltage is correspondingly reduced below a threshold value. In the case of indirect activation or deactivation, the sensor element itself is active all the time, i.e. in the previous example when a bias voltage is applied. Instead, for example, a readout element is deactivated, or storage of the detected photons in a memory is disabled or prevented.

During the measurement cycle, at least a subset of the sensor elements is activated at a first point in time. Preferably, these sensor elements are all part of one macro cell. Accordingly, activating at least one sensor element of the macro cell means that the macro cell is also active. The first point in time is preferably located at the beginning of the measurement cycle, in particular before, at the same time as or after the light pulse is emitted by the emitter element.

Once the sensor elements are activated, they can detect photons. For example, a detection can occur when the emitted and reflected laser light strikes the sensor element or when photons from the ambient radiation strike the sensor element. Every active sensor element increases a background noise level, which is detected by the sensor elements. By activating exclusively the illuminated sensor elements, the best possible signal-to-noise ratio can be obtained. However, as the measurement time increases, the position of the incident laser light changes so that the sensor elements are only able to detect the emitted laser light at all within a certain time segment of the measurement cycle.

Therefore, at a second point in time within the measurement cycle, which occurs after the first point in time, one or more sensor elements are activated and/or one or more sensor elements are deactivated. These are preferably sensor elements of the active macro cell. This means that precisely those sensor elements that can detect a reflected laser light are active. In addition, the inactive sensor elements do not contribute to an increase in the background noise.

As an example, all the sensor elements of the macro cell are activated during a measurement cycle. For measurement in the near field, the intensity of the reflected laser light is relatively high, so that the incident laser light can be easily detected despite the high background noise level. In the far-field measurement, i.e. at the second point in time, some of the sensor elements are deactivated so that the background noise decreases and only the sensor elements that can detect the laser light at all are active.

In particular, one or more sensor elements can be activated at the second point in time. Alternatively, one or more sensor elements can be deactivated at the second point in time. In another alternative, one or more sensor elements can be activated and one or more other sensor elements deactivated simultaneously. Simultaneously also encompasses, in addition to the identical point in time, a temporally proximal sequence of activation and deactivation of the sensor elements.

This method can be used in particular in TCSPC, which performs a plurality of measurement cycles, in addition to other methods that require only a single measurement cycle, for example.

On the expiry of a measurement time of the measurement cycle, the sensor elements and hence the macro cells are deactivated again. After the number of required measurement cycles, the resulting measurement data are evaluated by an evaluation unit. On the basis of the time of flight of the detected photons, objects and their distances are determined.

The evaluation unit can be designed as a stand-alone component or as an integral part of the receiving unit.

According to the above statements, one or more sensor elements can also be activated and/or one or more sensor elements deactivated at a third or further points in time.

The targeted activation and deactivation of sensor elements therefore allows an improvement in the near detection and the remote detection to be achieved for a LIDAR measuring system or a LIDAR receiving unit.

For example, a common detection range for such a LIDAR measuring system is 300 metres, which means a required transit time of the pulse to an object at a distance of 300 metres and back is about two microseconds.

In the following, advantageous embodiments of the method are explained.

The time interval between the first and the second point in time is particularly advantageously between 50 and 500 nanoseconds long, in particular 200 nanoseconds.

A duration of 200 nanoseconds between the points in time corresponds approximately to a time of flight of 60 metres for the light pulse, or a measurement distance of 30 metres. This represents a good ratio in order to optimize the near-field detection while also maintaining an optimum signal-to-noise ratio for longer measurement distances. In particular, a time interval between 150 and 350 nanoseconds is also particularly advantageous.

Depending on the hardware design of the measuring system, switching between two measurement ranges preferably takes place between 5% and 50% of the specified maximum measurement range.

Advantageously, a potentially incident laser light undergoes a displacement at the receiving unit over the duration of the measurement cycle, wherein the sensor elements form an active region and are activated and/or deactivated in such a manner that the active region follows this displacement.

As mentioned above, the displacement arises due to the parallax effect. It is therefore ensured that at least the sensor elements which are expected to be illuminated by a reflected laser light are active.

In one example, the expected incident laser spot on the receiving unit moves upwards over several rows of sensor elements. In one variant, all sensor elements can then be active, wherein a lower half, no longer illuminated, is deactivated at the second point in time. Alternatively, the cells are deactivated successively row by row from bottom to top. It is also possible that two lines are always active, so that successively one line above the active lines is activated and a lowest line of the active lines is deactivated.

A sensor element thus does not follow the expected incoming laser spot itself, rather exactly those sensor elements at which the laser light would arrive are active.

In particular, these active sensor elements form an active region. This active region follows the displacement of the potentially incident laser light. This active region is preferably formed by sensor elements of a single macro cell.

In addition, a further method for the improved near and remote detection of a LIDAR receiving unit according to Claim 3 is proposed. This method also achieves the object stated at the outset. The dependent claims contain descriptions of advantageous embodiments.

The basic structure of the LIDAR receiving unit for the application of the method is essentially identical to that described above. The previous statements can therefore be applied mutatis mutandis to the method described in the following. Differences between the measuring systems or the receiving units are explained in detail in the following.

Here again, the receiving unit and the transmitting unit are implemented in the focal plane array configuration, the planes of which are arranged at the focal point of the corresponding lens. In addition, a macro cell is also assigned to an emitter element, or an emitter element maps onto a macro cell of the receiving unit by means of the corresponding lenses.

The receiving unit has a plurality of sensor elements. The sensor elements are assigned to macro cells, wherein a macro cell has at least two sensor elements. The macro cell is further sub-divided into a plurality of readout cells, at least one first readout cell and one second readout cell. The first readout cell has at least one first sensor element and one first readout element, wherein the at least one sensor element is connected to the first readout element. In addition, the second readout cell has at least one second sensor element and one second readout element, wherein the at least one second sensor element is connected to the second readout element. Advantageously, each readout cell has a plurality of sensor elements, the total number of the sensor elements of the readout cell corresponding to the number of sensor elements of the higher-level macro cell.

If a plurality of sensor elements are formed in a readout cell, then each sensor element is preferably connected to one readout element. If appropriate, all sensor elements of a readout cell can be connected to the same readout element. If more than one sensor element and more than one readout element are formed in a readout cell, the first sensor elements can each be connected to a dedicated first readout element or connected to the first readout elements in groups. The same applies to the second readout cell and its second sensor elements and its second readout elements. One sensor element is preferably connected to one readout element, wherein a readout element can also be connected to more than one sensor element. A readout element can also be connected to more than one sensor element of different macro cells.

During the measurement cycle, at least a subset of the readout cells is activated at a first point in time. This can be, for example, a single readout cell, a plurality of readout cells, if present, or else all readout cells of the macro cell. A readout cell is active when a sensor element, the associated readout element and a memory cell are active together. In other words, when an incoming photon, for example from a laser pulse, is detected by the sensor element, the readout element is read out and stored within the memory element. A readout cell can be controlled, for example, by activating and deactivating the sensor element, as well as by activating and deactivating the readout unit.

At a second point in time within the measurement cycle, which occurs after the first point in time, one readout cell is activated and/or one readout cell is deactivated. Accordingly, one readout cell can be activated. Alternatively, one readout cell can be deactivated. In another alternative, one readout cell is activated and another readout cell is deactivated at the same time. Any other readout cells that may be present remain in their original state.

The time points mentioned here and also the measurement cycle correspond essentially to the above statements on the method according to Claim 1. The above statements are therefore applicable mutatis mutandis.

As an example, at the first point in time a first readout cell and a second readout cell are activated, wherein at the second point in time the first readout cell remains active and the second readout cell is deactivated. This results in a lower noise background, which enables a better evaluation of the measurement data.

Only one sensor element or a plurality of sensor elements can be active per readout cell. However, advantageously not all of the sensor elements of the readout cell are active, but only some of them. Particularly advantageously, at the end of the measurement cycle the memory element is filled by the readout unit, the evaluation unit then determining the distance to the detected object according to the time of flight principle.

In the following, advantageous embodiments of the method are described.

The time interval between the first and the second point in time is particularly advantageously between 150 nanoseconds to 500 nanoseconds long, in particular 200 nanoseconds.

A duration of the time segment of 200 nanoseconds corresponds approximately to a time of flight of 60 metres for the light pulse. This represents a good ratio in order to optimize the near-field detection while also maintaining an optimum signal-to-noise ratio with longer distances to the object. In particular, a time interval between 150 and 350 nanoseconds is also particularly advantageous.

Depending on the hardware design of the measuring system, switching between two measurement ranges preferably takes place between 5% and 50% of the specified maximum measurement range.

Advantageously a potentially incident laser light undergoes a displacement at the receiving unit over the duration of the measurement cycle, wherein the readout cells form an active region and are activated and/or deactivated in such a manner that the active region follows this displacement.

As mentioned above, the displacement arises due to the parallax effect. It is therefore ensured that at least the readout cells which are predicted to be illuminated by a reflected laser light are active.

In one example, the expected incident laser spot on the receiving unit moves upwards across several rows of readout cells elements. In one variant, all readout cells can then be active, wherein a lower half, no longer illuminated, is deactivated at the second point in time. Alternatively, the cells are deactivated successively row by row from bottom to top. It is also possible that two lines are always active, so that successively one line above the active lines is activated and one bottom line of the active lines is deactivated.

A readout cell thus does not follow the expected incoming laser spot itself, rather exactly those readout cells at which the laser light would arrive are active.

In particular, these active readout cells form an active region. This active region follows the displacement of the potentially incident laser light. This active region is preferably formed by the readout cells of a single macro cell.

In addition to the first readout cell and the second readout cell, other cells can also be similarly formed, which are deactivated and/or activated in a respective further time segment. For example, these can be deactivated one after the other.

This LIDAR measuring system is suitable for one of the methods according to Claims 1 to 4 or according to at least one of the methods explained above. Physical embodiments of such a LIDAR measuring system can be found in the preceding statements.

This LIDAR measuring system is suitable for one of the methods according to Claims 1 to 4 or according to at least one of the methods explained above. Constructional embodiments of such a LIDAR measuring system can be found in the preceding statements.

The measuring system has a receiving unit with sensor elements, among other components. In addition, the measuring system advantageously has a transmitting unit with emitter elements. A control element of the measuring system now provides control of the emitter elements and the sensor elements.

In particular, the control element ensures that the individual elements are activated and deactivated at the correct timing points, so that the measurement operation runs synchronously. This is particularly important in the case of a plurality of measurement cycles within one measurement operation. Such a control is formed, for example, by a timing generator, which provides a sufficiently accurate time measurement and precisely specifies the timing points for switching the elements. This ensures that the measurement operation remains synchronized over a plurality of measurement cycles, so that optimal measurement results are obtained. This is particularly advantageous when the TCSPC method is used.

The control element in this case can specify the switching times of the emitter element and sensor elements. Alternatively, the control element can also specify the switching times for readout cells as well as for other elements of the measuring system. In particular, the control element provides a reference time for the histogram.

Figures 2A, 2B:
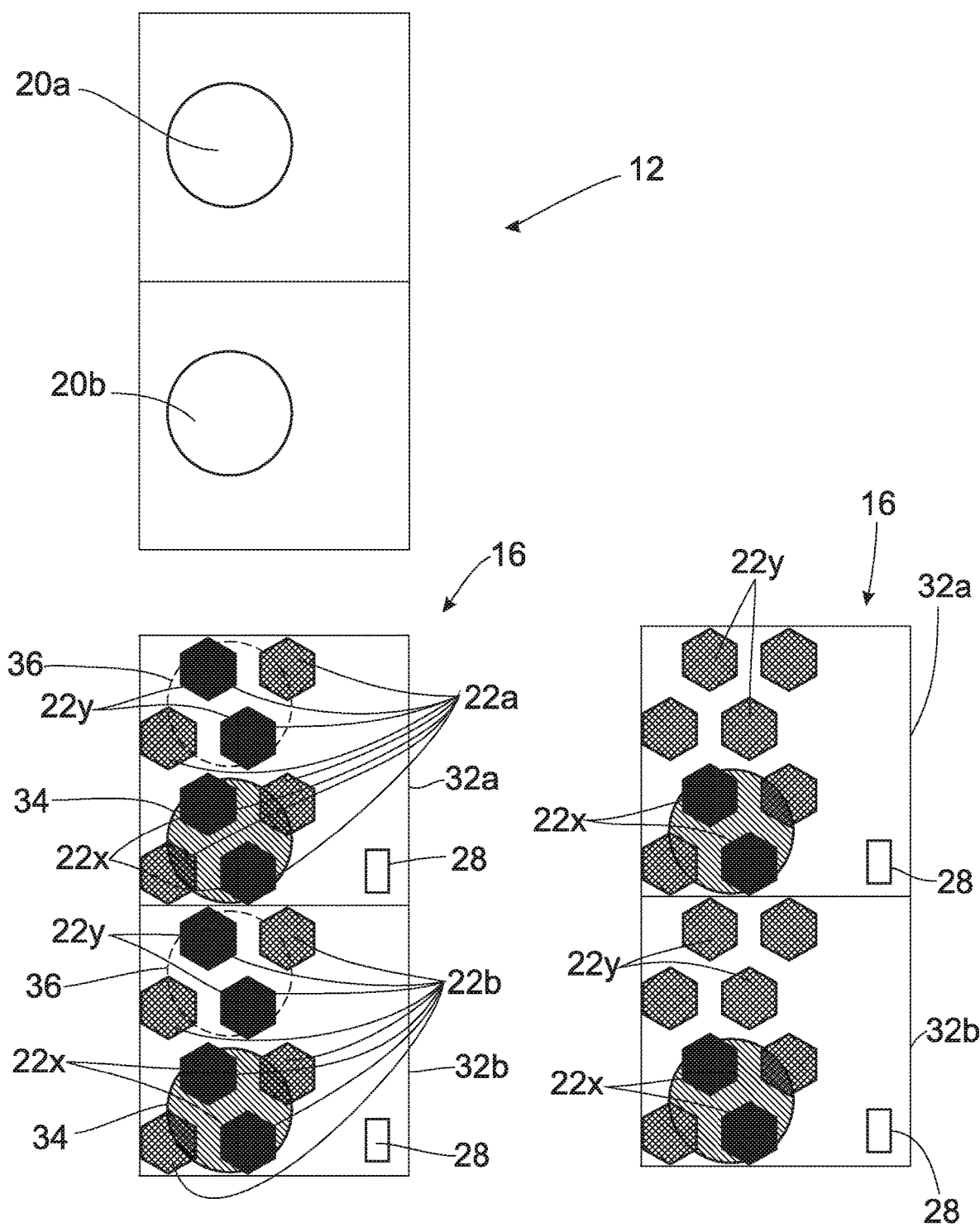
Figure 3:
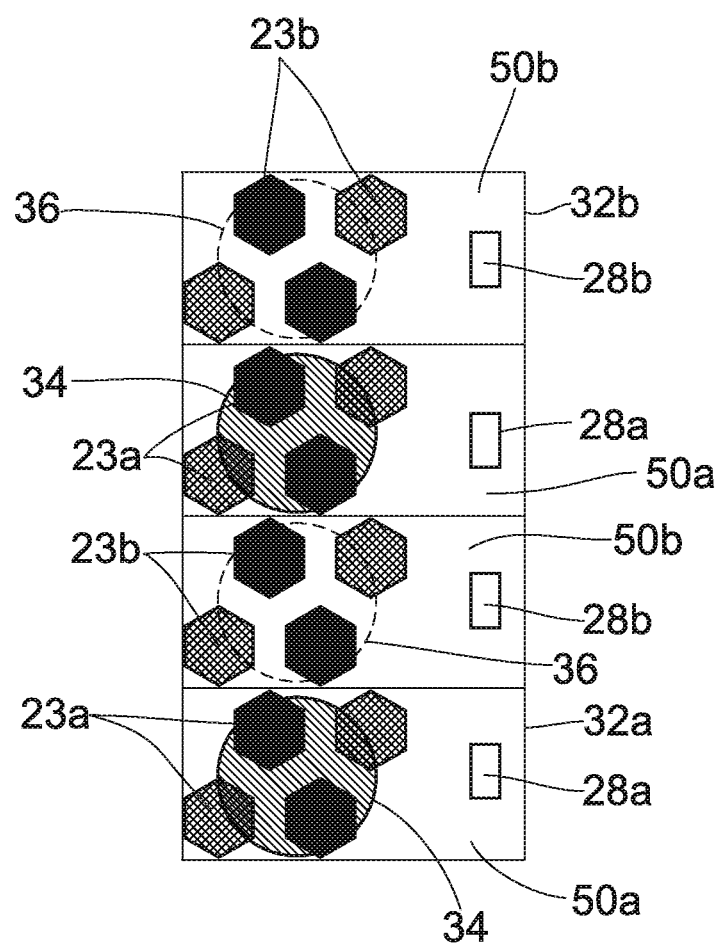
Figure 4:
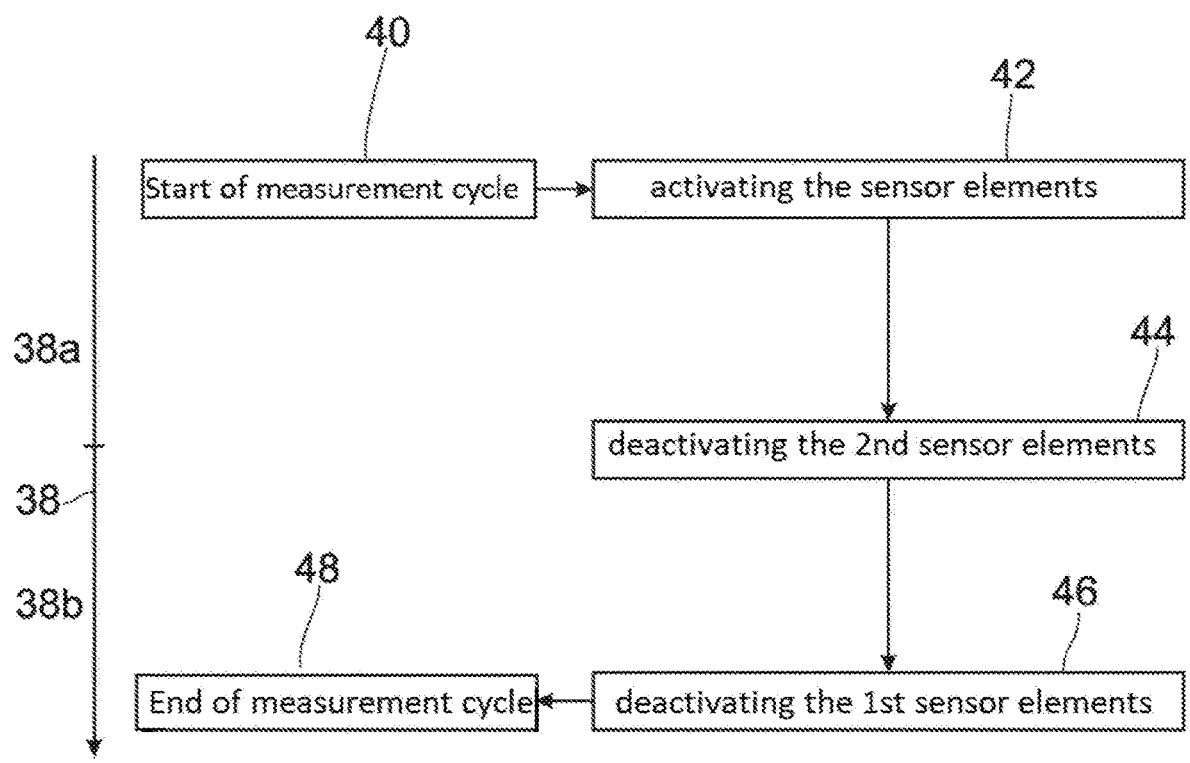

Examples of the methods are explained in the following by reference to several figures. Shown are:

FIG. 1 schematic drawing of a LIDAR measuring system;

FIG. 2a, 2b schematic drawing of a detail of a LIDAR receiving unit with sensor elements;

FIG. 3 a further variant of a LIDAR receiving unit in another configuration;

FIG. 4 flow chart of a measurement cycle.

FIG. 1 shows a schematic drawing of a LIDAR measuring system 10. The LIDAR measuring system 10 has a transmitting unit 12 and a transmitting lens 14 in addition to a receiving unit 16 and a receiving lens 18. The transmitting unit 12 and the receiving unit 16 are implemented in the focal plane array configuration. This means that the emitter elements 20 of the transmitting unit 12 and the sensor elements 22 of the receiving unit 16 are formed on a plane surface. This plane surface can be formed by a chip, for example. In addition, the units 12 and 16 are arranged in a focal plane or at a focal point of the transmitting lens 14 and the receiving lens 16.

The emitter elements 20 are preferably designed as vertical cavity surface-emitting lasers, or VCSELs. The sensor elements 22 are advantageously formed by single photon avalanche diodes, also known as SPADs. An advantage of this configuration is that no moving parts are required.

The transmitting unit 12 and the receiving unit 16 have a plurality of emitter elements 20 or a plurality of sensor elements 22, which are assigned to a respective solid angle by the lens 14 and 18. The transmitting unit and the receiving unit 22 each have emitter elements 20 and sensor elements 22 assigned to each other. FIG. 1 shows an example, exaggerated for clarity, with two emitter elements 20 and two sensor elements 22. In the example illustration, the transmitting unit 12 has only two emitter elements 20a and 20b and the receiving unit 16 has only two sensor elements 22a and 22b. The number of sensor elements 22 and emitter elements 20 in a measuring system 10 is usually substantially higher. FIG. 1 can be used essentially to explain the parallax effect.

During a measurement cycle, an emitter element 22 emits laser light, preferably in the form of a laser pulse, which is emitted via a transmitting lens 14 into a first solid angle 24. The laser pulse is then reflected on any object present and projected onto the receiving unit 16 via the receiving lens 18. A sensor element 22 also observes a particular solid angle 26 via the lens.

Angles and aspect ratios are exaggerated in the example shown. The first solid angle 24a, into which the emitter element 20a emits its laser light, has a divergence of 10 degrees and is inclined upwards by approximately 20 degrees. The first solid angle 24b, into which the emitter element 20b emits its laser light, has no inclination, but also has a divergence of 10 degrees. The same applies to the two sensor elements 22a and 22b, which via the receiving lens 18 with the sensor element 22a observes a second solid angle 26a, which has an upward inclination of about 20 degrees at a divergence of 10 degrees, and the sensor element 22b observes the solid angle 26b at an inclination of 0 degrees and a divergence of 10 degrees.

Due to the exaggerated representation of FIG. 1 it is immediately apparent that there is not always an overlap between the solid angles 24 and 26. Nevertheless, emitter element 20a is assigned to the sensor element 22a and the emitter element 20b is assigned to sensor element 22b. These solid angles will essentially completely overlap at large distances. In the near range, which is shown in FIG. 1, only a small overlap is shown and this also only occurs in a region IV. In this near range, there are different regions of overlap between the different solid angles. In a first region I there is no overlap of the solid angles. In region II, an overlap occurs for the first time between the first solid angle 24b and the second solid angle 26a. If an object is located at this distance from the LIDAR measuring system 10, a reflected laser pulse can be detected by the receiving unit.

The same applies to region III, where an overlap is still present between the two solid angles. The overlap increases in region II and decreases again in region III, where this is a maximum at position 2 and decreases again towards position 3. An overlap of the solid angles 24b and 26b begins from position 3 in region IV and increases to a maximum overlap at a longer distance. The best detection of an object is achieved in this exaggerated exemplary embodiment towards position 2 and at the end of region IV, i.e. at a large distance. It is also apparent that the laser light incident on the receiving unit 16, which is reflected at an object, executes a movement along the sensor elements 22 as an object approaches. The light projected onto the receiving unit 16 always moves towards the transmitting unit 12 as an object approaches. In this case, from the sensor element 22b to the sensor element 22a. In this sense, the remote object A is detected by the sensor element 22b, whereas the object B in the near field is detected by the sensor element 22a.

In a specific embodiment of such a measuring system 10, substantially more sensor elements 22 are arranged on the receiving unit 16, so that a continuous detection can be carried out over all regions.

An emitted and reflected laser pulse is therefore detected by a sensor element 22, which is read out by a readout element 28 and the resulting measured data are evaluated by an evaluation unit 30. The time of flight principle is applied. In most cases, the readout unit 28 temporarily stores the measurement data in a memory element from which the evaluation unit 30 receives the measurement data. The evaluated data can then be passed on to other components of the vehicle.

FIG. 2a shows a transmitting unit 12 and a receiving unit 16. These are arranged one above the other, for example, but can also be arranged next to each other. The illustration shows only a small section of the transmitting unit 12 and the receiving unit 16 in addition to their emitter elements and sensor elements. The transmitting unit 12 has the emitter elements 20a and 20b, and the receiving unit 16 has the sensor elements 22a and 22b. The sensor elements 22 are arranged in macro cells 32, illustrated here by frames in the form of boxes. The logical sub-division of the evaluation unit 30 here also corresponds, for example, to the hardware-based division into macro cells 32.

The receiving unit 14 has more sensor elements 22 than the transmitting unit 12 has emitter elements 20. This is due on the one hand to the parallax effect and, on the other hand, to the mapping characteristics of the emitter elements 20 onto the receiving unit 16. In particular, the area illuminated by an emitter element 20 is larger than the area of a sensor element 22. A macro cell 32 is defined by the sensor elements 22 which are arranged in the potential imaging region of the emitter element. The imaging region of the emitter element 20 on the receiving unit 16 is larger than the surface of the emitter element 20 itself. This is due to the effects already explained.

In this case, each macro cell 32 has its own separate sensor elements 22a and 22b. The macro cell 32a has the sensor elements 22a and the macro cell 32b has the sensor elements 22b. However, sensor elements may also be assigned to several macro cells. This means that macro cells can overlap each other. As an example, a circle 34 is drawn, which represents a theoretical imaging point of an emitter element 20a and 20b on the corresponding macro cell 32a and 32b in the case of reflection at an object at a long distance. In addition, a dashed-line circle 36 is shown as an example, which illustrates an imaging characteristic in the near range. As already mentioned, the laser light incident on the receiving unit 14 moves from the far field, starting from the theoretical far-field position, towards the transmitting element 12, hence upwards since the transmitting unit 12 is arranged above the receiving unit.

The sensor elements in FIG. 2a are partially shaded in black, i.e. active, or shown as hatched, i.e. inactive, sensor elements 22. Each of the sensor elements 22 can be individually activated and deactivated. In the case of a SPAD, this can be achieved by raising or lowering a bias voltage. Due to the facility for individual activation and deactivation, it is always possible to activate the sensor elements which a laser light is expected to strike. This enables, for example, the compensation of imaging errors.

The relevant macro cells 32 are activated at the start of a measurement cycle. At the start of the measurement cycle, a subset of sensor elements is activated, for example. If appropriate, all sensor elements of the active macro cell 32 can also be active. A macro cell 32 is active in particular when at least one associated sensor element is active and the measurement data can be read out by a readout element 28.

The readout element 28 is shown in FIGS. 2a and 2b and in this case is connected to all sensor elements 22 of the respective macro cell 32.

To improve the near- and far-field detection, the sensor elements 22 are activated and/or deactivated at different timing points of the measurement cycle, in this case the latter. The sensor elements 22 of a macro cell 32 can thus be divided into first sensor elements 22x and second sensor elements 22y. If appropriate, third or even additional sensor elements can also be formed.

At the first point in time within a measurement cycle, preferably at the beginning of the measurement cycle or shortly thereafter, the first sensor elements 22x and the second sensor elements 22y of the macro cells 32 are activated. In FIG. 2a this is indicated by the colour filling. The active sensor elements 22 are completely filled. It is these active sensor elements 22 that undergo the best illumination by the reflected laser light. The other sensor elements, which are only partially illuminated, are deactivated, and therefore shown hatched. This enables an optimal signal-to-noise ratio to be achieved, since only illuminated sensor elements can determine meaningful measurements. Non-illuminated or poorly illuminated sensor elements 22 primarily detect an ambient illumination, i.e. a noise background, which degrades the signal-to-noise ratio.

By activating the first and second sensor elements 22x and 22y, objects in a near range can be detected. Due to the proximity of the object to the LIDAR measuring system 10, a high intensity is also available, which can compensate for any increase in the noise background without difficulty by the use of a plurality of sensor elements. With increasing duration of the measurement cycle, the first time segment ends, after which a second time segment begins at the second point in time.

At the second point in time during the measurement cycle, the first sensor elements remain 22x active, whereas the second sensor elements 22y are deactivated. This can occur, for example, after a period of about 200 nanoseconds. This corresponds to an object at a distance of about 30 metres, wherein from this distance on it can be assumed that the solid angles 24 and 26 already sufficiently overlap in the far field. In other words, as the distance to the object increases, the incoming laser pulse moves from the dashed circle 36 towards the circle 34.

By deactivating the second sensor elements 22y, which are now no longer illuminated, the background noise can be significantly reduced. This also compensates for a reduced intensity of the back-scattered laser light.

Within the first time segment, the sensor elements 22x and the sensor elements 22y contribute to the measurement, whereas in the second time segment only the sensor elements 22x contribute to the measurement. Therefore, within the first time segment the sensor elements 22x and 22y form the active region. During the second time segment, the active region therefore only comprises the sensor elements 22x. If further, for example third or fourth, sensor elements 22 are used, a correspondingly larger number of timing points is required at which the sensor elements are successively deactivated.

For example, the sensor elements 22, which are neither sensor elements 22x nor 22y, are deactivated based on a calibration. This calibration determines, for example, static imaging errors, for example due to tolerances or inaccuracies in the lenses used. Such sensor elements can remain inactive during the entire measurement cycle.

The drawing of FIG. 1 also shows a control element 29. This control unit coordinates the correct timing sequence of the measurement cycles and of the measurement operation. This unit activates and deactivates emitter elements 20 and the sensor elements 22 at the correct points in time. In particular, such a control element 29 is also known as a timing generator.

FIG. 4 shows the corresponding sequence of such a measurement cycle. This is plotted along a time axis 38. The measurement cycle starts at step 40. The first and second sensor elements are activated in step 42 at the first timing point, at the start of the measurement cycle or slightly offset from it. After the first time segment 38a has elapsed, in step 44 the second sensor elements are deactivated at the second timing point. After the second time segment 38b has elapsed, the measurement cycle 48 ends with the deactivation of the remaining first sensor elements in step 46. Finally, in step 46, all sensor elements are deactivated. The deactivation of the second sensor elements 22y from step 44 is illustrated in FIG. 2b. It is evident that only the first sensor elements 22x remain active and the sensor elements 22y are deactivated.

For example, such a measurement cycle can be performed once only during a measurement operation. During a measurement process according to the TCSPC procedure, such a measurement cycle is repeated multiple times.

Another variant is shown in FIG. 3. The configuration of the LIDAR measuring system 10 is substantially the same as the configuration of the LIDAR measuring system 10 of the previous design variant. The above statements apply in the same way, mutatis mutandis. The differences will be explained.

The macro cells 32 are divided into readout cells 50. In this case a macro cell 32 has at least one first readout cell 50a and one readout cell 50b. Each readout cell 50 has a separate readout element 28, which is connected to the sensor elements 23 of the readout cell 50. Accordingly, the first sensor elements 23a of the first readout cell 50a are connected to the first readout element 28a, the second sensor elements 23b of the second readout cell 50b are connected to the second readout element 28b.

In this exemplary embodiment, one readout element 28 is formed for each readout cell 50. According to other design variants, however, further readout elements 28a and 28b can also be formed in the respective readout cells 50.

In principle, a readout element 28 of a first readout cell 50a can also be connected to further first sensor elements 23a of other first readout cells 50a. The same applies also to the second sensor elements 23b of the second readout cells 50b.

The timing sequence of the method is essentially the same as that of FIGS. 2a, 2b and 4 and the accompanying explanations. However, it is not the sensor elements 23 as such that are activated and deactivated, but the readout cells 50a and 50b. Accordingly, in the first time segment the readout cells 50a and 50b are active, whereas in the second time segment the readout cells 50b are deactivated.

However, in this case the sensor elements are not necessarily activated and deactivated. The readout cells can also be activated or deactivated. This can be carried out, for example, by activating or deactivating readout elements themselves or by defining time windows within which the readout elements are allowed to write to the memory. This means that a corresponding readout element only reads out the measurement data of the sensor elements and stores them in the memory element within the first and/or the second time segment.

After completion of a measurement operation the evaluation unit 30 calculates the distance to the object using the first and second sensor elements for the near field, and only using the measurements of the first sensor elements 23*a* of the first readout cell 50*a* for the far field. This also provides an improved signal-to-noise ratio.

FIG. 4 can be interpreted essentially identically. It is only necessary to replace the activation or deactivation of the sensor element in steps 42, 44, and 46 by the activation or deactivation of the readout cell.

The invention claimed is:

1. Method for an improved near and remote detection at a LIDAR receiving unit,
   wherein the receiving unit has a plurality of sensor elements,
   wherein a macro cell has at least one first readout cell and one second readout cell,
   wherein the first readout cell has at least one first sensor element, which is connected to a first readout element and
   wherein the second readout cell has at least one second sensor element, which is connected to a second readout element, wherein
   wherein at a first point in time within a measurement cycle at least a subset of readout cells on the active macro cell is activated,
   wherein at a second point in time within the measurement cycle, which occurs after the first point in time, one readout cell is activated and/or one readout cell is deactivated.

2. Method according to claim 1, wherein the time interval between the first point in time and the second point in time is between 50 to 500 nanoseconds long, in particular 200 nanoseconds.

3. Method according to claim 1, wherein a potentially incident laser light undergoes a displacement at the receiving unit over the duration of the measurement cycle, wherein the readout cells form an active region and are activated and/or deactivated in such a manner that the active region follows this displacement.

4. LIDAR measuring system, which uses a method for an improved near and remote detection at a LIDAR receiving unit,
   wherein the receiving unit has a plurality of sensor elements,
   wherein a macro cell has at least one first readout cell and one second readout cell,
   wherein the first readout cell has at least one first sensor element, which is connected to a first readout element and
   wherein the second readout cell has at least one second sensor element, which is connected to a second readout element, wherein
   wherein at a first point in time within a measurement cycle at least a subset of readout cells on the active macro cell is activated,
   wherein at a second point in time within the measurement cycle, which occurs after the first point in time, one readout cell is activated and/or one readout cell is deactivated.

* * * * *